(12) United States Patent
Masuda

(10) Patent No.: US 10,508,779 B2
(45) Date of Patent: Dec. 17, 2019

(54) PROJECTOR

(71) Applicant: SEIKO EPSON CORPORATION, Tokyo (JP)

(72) Inventor: Tomoharu Masuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/767,120

(22) PCT Filed: Oct. 14, 2016

(86) PCT No.: PCT/JP2016/004574
§ 371 (c)(1),
(2) Date: Apr. 9, 2018

(87) PCT Pub. No.: WO2017/064868
PCT Pub. Date: Apr. 20, 2017

(65) Prior Publication Data
US 2019/0072244 A1 Mar. 7, 2019

(30) Foreign Application Priority Data

Oct. 16, 2015 (JP) .................................. 2015-204662

(51) Int. Cl.
*F21S 2/00* (2016.01)
*F21V 7/22* (2018.01)
(Continued)

(52) U.S. Cl.
CPC ................ *F21S 2/005* (2013.01); *F21V 7/22* (2013.01); *F21V 9/08* (2013.01); *F21V 9/30* (2018.02); *G03B 21/145* (2013.01); *H04N 9/31* (2013.01)

(58) Field of Classification Search
CPC .. G03B 21/142; G03B 21/145; G03B 21/204; G03B 21/00–64; H04N 9/31–3197; G02B 27/01–0189
See application file for complete search history.

(56) References Cited

U.S. PATENT DOCUMENTS 8,820,940 B2 9/2014 Kita
9,323,046 B2 4/2016 Kita
(Continued)

FOREIGN PATENT DOCUMENTS

JP   H05-127141 A    5/1993
JP   H05-323266 A   12/1993
(Continued)

OTHER PUBLICATIONS

Nov. 22, 2016 International Search Report issued in International Patent Application No. PCT/JP2016/004574.

*Primary Examiner* — Cara E Rakowski
*Assistant Examiner* — Christopher A Lamb, II
(74) *Attorney, Agent, or Firm* — Oliff PLC

(57) ABSTRACT

A projector includes: an illumination device; first color separation device that separates first and second color light from light emitted from the illumination device; second color separation device that separates third and fourth color light from the second color light; plurality of light modulation devices that modulate the lights separated by the first and second devices; projection optical device that projects an image based on the modulated lights; first and second filters provided on optical paths of the third and fourth color lights, respectively. A wavelength of the third color light is shorter than that of the fourth. The first filter attenuates light at a wavelength exceeding a first threshold set in a dimming wavelength region between a wavelength region of the third and fourth color lights. The second filter attenuates light at
(Continued)

a wavelength equal to or less than a second threshold set in the dimming wavelength region.

10 Claims, 5 Drawing Sheets

(51) Int. Cl.
*F21V 9/08* (2018.01)
*F21V 9/30* (2018.01)
*G03B 21/14* (2006.01)
*H04N 9/31* (2006.01)

(56) References Cited

U.S. PATENT DOCUMENTS

| | | | | |
|---|---|---|---|---|
| 2001/0055096 | A1* | 12/2001 | Kodama | G03B 21/28 353/71 |
| 2003/0227577 | A1* | 12/2003 | Allen | G02B 26/008 348/742 |
| 2004/0246448 | A1* | 12/2004 | Ogawa | H04N 9/3105 353/84 |
| 2010/0225887 | A1* | 9/2010 | Sato | G03B 21/005 353/31 |
| 2011/0310363 | A1 | 12/2011 | Kita | |
| 2015/0219870 | A1* | 8/2015 | Adema | G02B 7/006 359/892 |

FOREIGN PATENT DOCUMENTS

| | | |
|---|---|---|
| JP | H10-206970 A | 8/1998 |
| JP | H10-339847 A | 12/1998 |
| JP | H11-174371 A | 7/1999 |
| JP | H11-239311 A | 8/1999 |
| JP | 2000-347287 A | 12/2000 |
| JP | 2001-290215 A | 10/2001 |
| JP | 2002-258422 A | 9/2002 |
| JP | 2005-265927 A | 9/2005 |
| JP | 2006-338030 A | 12/2006 |
| JP | 2009-229475 A | 10/2009 |
| JP | 2012-004009 A | 1/2012 |

* cited by examiner

PROJECTOR

TECHNICAL FIELD

The present invention relates to a projector.

BACKGROUND ART

An image display device that modulates illumination light emitted from a light source device to form an image in response to image information and enlarges and projects the image onto a projection surface such as a screen has been conventionally known (e.g., see PTL 1).

The image display device disclosed in PTL 1 includes an illumination device, a polarization separation device, a spectroscopic device, liquid crystal panels, a prism, and a projection optical device. The illumination device includes an excitation light source that emits excitation light, and a phosphor. The phosphor converts a portion of incident excitation light to fluorescence at a wavelength different from the excitation light. The fluorescence and another portion of the excitation light are emitted as illumination light from the phosphor toward the same side as the side on which the excitation light is incident. The spectroscopic device includes two dichroic mirrors. A first dichroic mirror separates blue light from the illumination light, and a second dichroic mirror separates red light and green light therefrom. These separated color lights are modulated by the liquid crystal panels respectively corresponding thereto. Then, the color lights modulated by the liquid crystal panels are combined by the prism and projected from the projection optical device.

CITATION LIST

Patent Literature

PTL 1: JP-A-2012-4009

SUMMARY OF INVENTION

Technical Problem

Incidentally, in a projector using the phosphor disclosed in PTL 1, a configuration in which switching to a mode (e.g., a cinema mode, etc.) of expanding the color gamut of the image projected from the projection optical device is possible is requested. In general, in the mode of expanding the color gamut, a filter that attenuates light in the wavelength region of cyan light between the wavelength region of blue light and the wavelength region of green light and in the wavelength region of yellow light between the wavelength region of green light and the wavelength region of red light is required. However, in the case of the projector using the phosphor, it is sufficient to attenuate the light in the wavelength region of yellow light, which is the wavelength region of fluorescence. For this reason, a configuration is conceivable in which a filter that attenuates the light in the yellow wavelength region between the red wavelength region and the green wavelength region is insertably and removably disposed upstream of the second dichroic mirror, which separates the red light and the green light, on the optical path.

However, in the configuration in which the above filter is insertably and removably disposed between the first dichroic mirror and the second dichroic mirror, when, for example, it is intended in adjustment of the light in the yellow wavelength region to expand the color gamut by sufficiently attenuating light at a predetermined wavelength to be attenuated, a wavelength region in which light is to be attenuated is widened, and thus there is a problem in that luminance is reduced. On the other hand, when the region of the predetermined wavelength to be attenuated is narrowed, the light in the predetermined wavelength region cannot be sufficiently attenuated, and thus there is a problem in that the color gamut is narrowed due to color mixing.

The invention is aimed at solving at least a portion of the problems described above, and it is an object of the invention to provide a projector capable of expanding a color gamut while suppressing a reduction in the luminance of a projection image.

Solution to Problem

A projector according to an aspect of the invention includes: an illumination device; a first color separation device that separates first color light and second color light from light emitted from the illumination device; a second color separation device that separates third color light and fourth color light from the second color light separated by the first color separation device; a plurality of light modulation devices that modulate the lights separated by the first color separation device and the second color separation device; a projection optical device that projects an image based on the lights modulated by the plurality of light modulation devices; a first filter that is insertably and removably provided on an optical path of the third color light; and a second filter that is insertably and removably provided on an optical path of the fourth color light, wherein a wavelength of the third color light is shorter than a wavelength of the fourth color light, the first filter attenuates light at a wavelength exceeding a first threshold set in an dimming wavelength region that is a wavelength region between a wavelength region of the third color light and a wavelength region of the fourth color light, and the second filter attenuates light at a wavelength equal to or less than a second threshold set in the dimming wavelength region.

As the first color separation device and the second color separation device, a dichroic mirror can be exemplified. Moreover, as the first filter and the second filter, a low-pass filter that transmits light at a wavelength shorter than the first threshold and attenuates light at a wavelength longer than the first threshold, and a high-pass filter that transmits light at a wavelength longer than the second threshold and attenuates light at a wavelength shorter than the second threshold can be exemplified. Further, the first threshold is a light wavelength at which 10% of light incident on the first filter is attenuated and 90% of the light is transmitted. The second threshold is a light wavelength at which 10% of light incident on the second filter is attenuated and 90% of the light is transmitted. In addition, the dimming wavelength region is a wavelength region in which the color gamut can be expanded by attenuating light with the filters, and a wavelength region exceeding the dimming wavelength region is a wavelength region in which light does not need to be attenuated.

According to the aspect, when the third color light separated by the second color separation device is incident on the first filter, the first filter attenuates the light at the wavelength exceeding the first threshold in the dimming wavelength region; while when the fourth color light is incident on the second filter, the second filter attenuates the light at the wavelength not reaching the second threshold in the dimming wavelength region. Therefore, in the dimming wavelength region, light in a wavelength region that cannot be used as the third color light and the fourth color light can be attenuated. In other words, the first filter transmits light at a wavelength not reaching the first threshold in the dimming wavelength region, and the second filter transmits light at a wavelength exceeding the second threshold in the dimming wavelength region. Therefore, the light at the wavelength not reaching the first threshold, among the light in the dimming wavelength region, can be used as the third color light, and the light at the wavelength exceeding the second threshold, among the light in the dimming wavelength region, can be used as the fourth color light. That is, it is possible to sufficiently attenuate the light in the dimming wavelength region by the first filter and the second filter, and it is also possible to suppress undue attenuation of light in the wavelength regions of the third color light and the fourth color light. Accordingly, it is possible to expand the color gamut while suppressing a reduction in the luminance of a projection image.

In the aspect, a difference between the first threshold and the second threshold is smaller than a bandwidth of the dimming wavelength region.

According to the aspect, the difference between the first threshold and the second threshold is smaller than the bandwidth of the dimming wavelength region, and therefore, a wavelength region of light transmitted through the first filter and the second filter can be expanded in the dimming wavelength region. According to this, the amount of light attenuated by the first filter and the second filter can be reliably reduced, and therefore, it is possible to reliably suppress a reduction in the luminance of the image to be projected.

In the aspect, it is preferable that the first filter and the second filter are switched between the state where both of them are inserted on the optical paths and the state where both of them are retracted from the optical paths.

According to the aspect, the first filter and the second filter are switched between the state where both the first filter and the second filter are inserted on the optical paths and the state where both the first filter and the second filter are retracted from the optical paths. Therefore, it is possible with a simple configuration to expand the color gamut while suppressing a reduction in the luminance of the projection image, compared to a configuration in which two filters (the first filter and the second filter) are separately inserted and removed.

In the aspect, it is preferable that the first filter and the second filter are stored in an overlapping manner between the optical path of the third color light and the optical path of the fourth color light.

Here, when the respective filters are individually stored in the different positions, spaces for storing the respective filters are needed, and thus there is a risk that the projector increases in size.

In contrast, in the aspect, the first filter and the second filter are stored in an overlapping manner between the optical path of the third color light and the optical path of the fourth color light, and therefore, the storage space can be reduced compared to the case where the first filter and the second filter are stored in different positions. Accordingly, the projector can be reduced in size.

In the aspect, it is preferable that the projector further includes a relay lens on the optical path of at least one of the third color light and the fourth color light, and that the first filter or the second filter, for which the relay lens is disposed, is insertably and removably provided on a light incident side of the relay lens on the optical path on which the relay lens is disposed.

Here, the relay lens is disposed on an optical path having a long distance to the light modulation device. For this reason, in an area adjacent to the optical path on which the relay lens is provided, the storage space for the first filter and the second filter is present. According to the aspect, at least one of the filters is insertably and removably provided on the light incident side of the relay lens, and therefore, the first filter and the second filter can be stored in the storage space. Accordingly, there is no need to separately provide storage spaces, and therefore, it is possible to suppress an increase in the size of the projector.

In the aspect, it is preferable that the illumination device includes a solid-state light source, and a phosphor on which light emitted from the solid-state light source is incident, that the first color light is blue light, that the second color light is color light containing green light and red light, that the third color light is green light, that the fourth color light is red light, that the wavelength region of the first filter is contained in a green wavelength region, that the wavelength region of the second filter is contained in a red wavelength region, and that the dimming wavelength region is set to a yellow wavelength region.

As the solid-state light source, a laser light source that emits blue light can be exemplified, and as the phosphor, a YAG phosphor can be exemplified.

Here, the light emitted from the illumination device including the phosphor and the solid-state light source contains fluorescence, and therefore, the intensity of light in the yellow light wavelength region in the wavelength region of the light emitted from the illumination device is substantially equal to the intensities of lights in the respective wavelength regions of the red light wavelength region and the green light wavelength region.

Moreover, according to the aspect, the first filter transmits, together with light in the green wavelength region, a portion of light in the yellow wavelength region as light in the green wavelength region, and the second filter transmits, together with light in the red wavelength region, a portion of light in the yellow wavelength region as light in the red wavelength region. According to this, the amount of light in the yellow wavelength region attenuated by the first filter and the second filter can be reduced in the red light and the green light that are separated by the second color separation device. Accordingly, it is possible to expand the color gamut while reliably suppressing a reduction in the luminance of the projection image.

DESCRIPTION OF EMBODIMENTS

Hereinafter, an embodiment of the invention will be described based on the drawings.

[Schematic Configuration of Projector]

Figure 1:
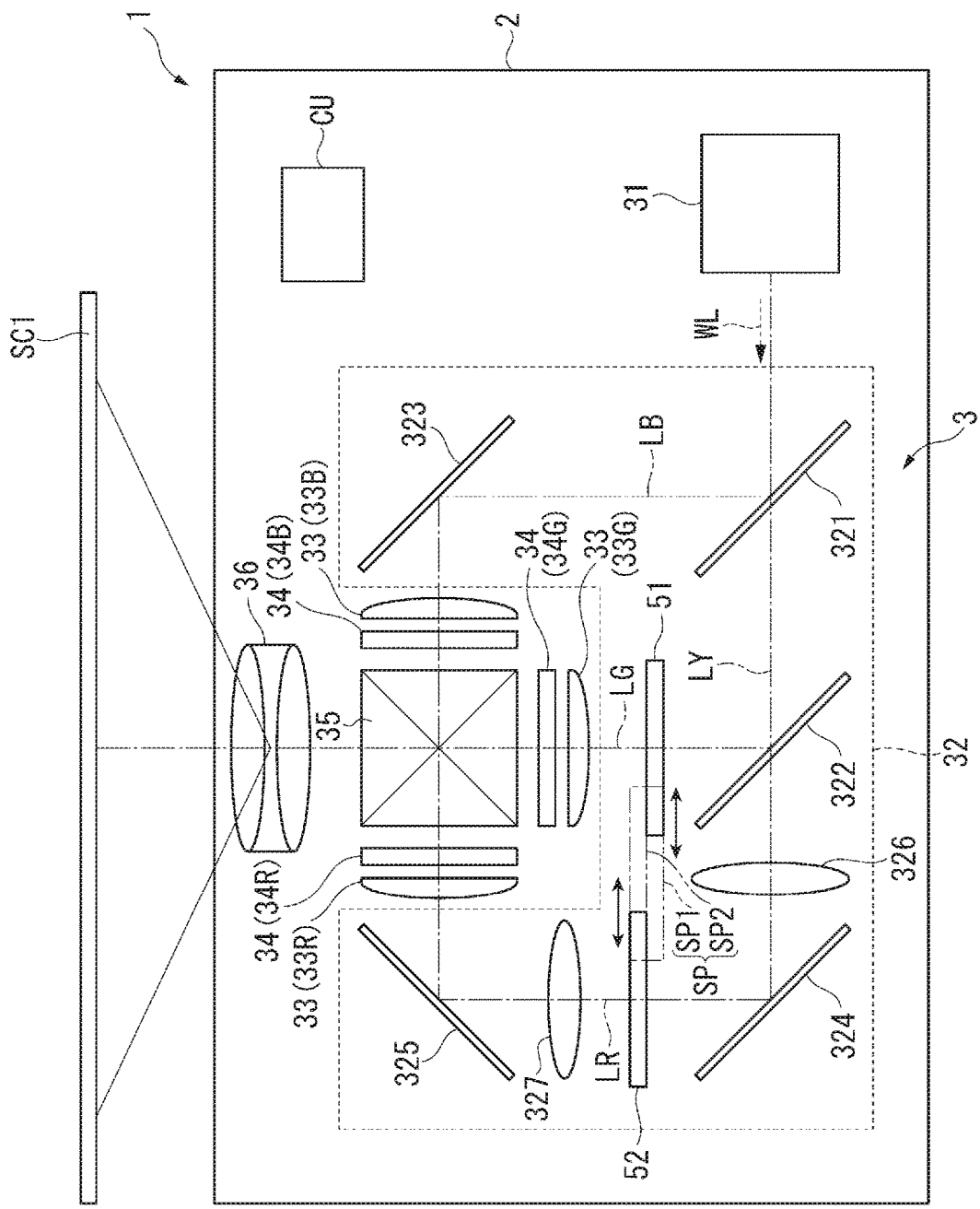
FIG. 1 A schematic view showing an outline of a projector according to an embodiment of the invention.

FIG. 1 is a schematic view showing the configuration of a projector 1 according to the embodiment.

The projector 1 is a display device that modulates a luminous flux emitted from a light source provided therein to form an image in response to image information and enlarges and projects the image onto a projection surface such as a screen SC1.

As shown in FIG. 1, the projector 1 includes an external housing 2, an optical unit 3 accommodated in the external housing 2, and a control device CU that controls the projector 1, and in addition includes, although not shown in the drawing, a cooling device that cools objects to be cooled, and a power source device that supplies power to electronic components constituting the projector 1. Moreover, the projector 1 has the function of changing, in response to the component ratio of light incident on a color combining device, the color gamut of an image projected from a projection optical device.

[Configuration of Optical Unit]

The optical unit 3 includes an illumination device 31, a color separation device 32, a parallelizing lens 33, a plurality of light modulation devices 34, a color combining device 35, a projection optical device 36, a first filter 51, and a second filter 52.

The illumination device 31 emits illumination light WL. The configuration of the illumination device 31 will be described later.

The color separation device 32 separates the illumination light WL incident from the illumination device 31 into three color lights, red light LR, green light LG, and blue light LB. The color separation device 32 includes dichroic mirrors 321 and 322, total reflection mirrors 323, 324, and 325, and relay lenses 326 and 327.

The dichroic mirror 321 corresponds to a first color separation device of the invention, and separates the blue light LB and light LY containing the other color lights (the green light LG and the red light LR) from the illumination light WL from the illumination device 31. The dichroic mirror 321 reflects the blue light LB and transmits the light LY containing the green light LG and the red light LR.

The dichroic mirror 322 corresponds to a second color separation device of the invention, and separates the green light LG and the red light LR from the light LY separated by the dichroic mirror 321. Specifically, the dichroic mirror 322 reflects the green light LG and transmits the red light LR.

The blue light LB corresponds to first color light of the invention; the light LY containing the green light LG and the red light LR corresponds to second color light of the invention; the green light LG corresponds to third color light of the invention; and the red light LR corresponds to fourth color light of the invention.

The total reflection mirror 323 is disposed in the optical path of the blue light LB, and reflects the blue light LB reflected by the dichroic mirror 321 toward the light modulation device 34 (34B). On the other hand, the total reflection mirrors 324 and 325 are disposed in the optical path of the red light LR, and reflect the red light LR transmitted through the dichroic mirror 322 toward the light modulation device 34 (34R). Moreover, the green light LG is reflected by the dichroic mirror 322 toward the light modulation device 34 (34G).

The relay lenses 326 and 327 are disposed downstream of the dichroic mirror 322 in the optical path of the red light LR. The relay lenses 326 and 327 have the function of compensating for the light loss of the red light LR due to the fact that the optical path length of the red light LR is longer than the optical path length of the blue light LB or the green light LG.

The parallelizing lens 33 parallelizes light incident on the light modulation device 34 to be described later. Parallelizing lenses for the respective color lights of red, green, and blue are respectively denoted by 33R, 33G, and 33B. Moreover, the light modulation devices for the respective color lights of red, green, and blue are respectively denoted by 34R, 34G, and 34B.

The plurality of light modulation devices 34 (34R, 34G, 34B) modulate the color lights LR, LG, and LB, separated by the dichroic mirror 321 and the dichroic mirror 322 and respectively incident on the light modulation devices, to form color images in response to image information. The light modulation devices 34 are each composed of a liquid crystal panel that modulates incident light. Although not shown in the drawing, an incident side polarizer and an exiting side polarizer are respectively disposed on the incident side and the exiting side of the light modulation devices 34R, 34G, and 34B.

The image lights from the light modulation devices 34R, 34G, and 34B are incident on the color combining device 35. The color combining device 35 combines the image lights corresponding to the color lights LR, LG, and LB, and causes the combined image light to be emitted toward the projection optical device 36. In the embodiment, the color combining device 35 is composed of a cross dichroic prism.

The projection optical device 36 projects the image light combined by the color combining device 35 onto the projection surface such as the screen SC1. With the configuration described above, an enlarged image is projected on the screen SC1.

The first filter 51 and the second filter 52 are respectively disposed on the optical paths of the green light LG and the red light LR, and have the functions of transmitting lights in different wavelength regions. The configurations of the first filter 51 and the second filter 52 will be described later.

[Configuration of Illumination Device]

Figure 2:
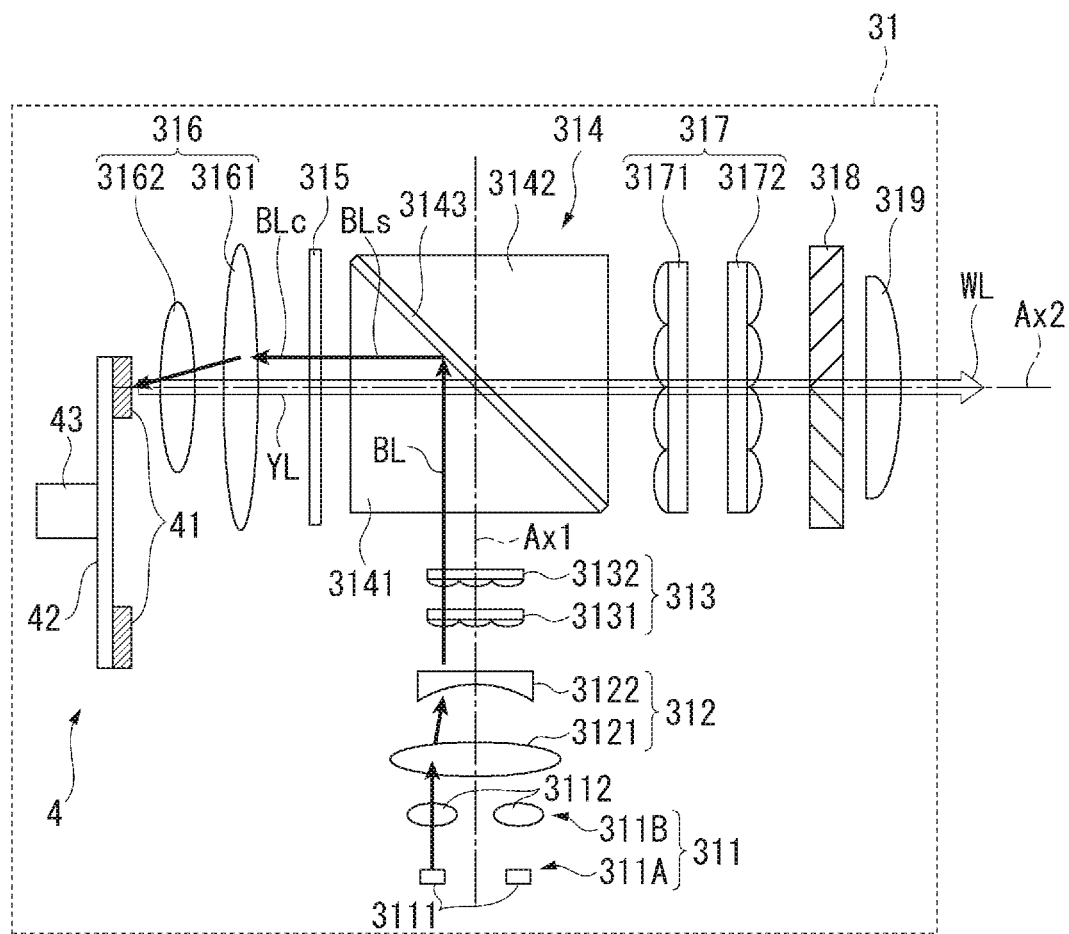
FIG. 2 A schematic view showing an outline of an illumination device of the projector according to the embodiment.

FIG. 2 is a schematic view showing the configuration of the illumination device 31 in the projector 1 of the embodiment.

The illumination device 31 emits the illumination light WL toward the color separation device 32 as described above. As shown in FIG. 2, the illumination device 31 includes a light source device 311, an afocal optical system 312, a homogenizer optical system 313, a polarization separation device 314, a retardation film 315, a pickup optical system 316, an integrator optical system 317, a polarization conversion element 318, a superimposing lens 319, and a fluorescent member 4. Moreover, the light source device 311 includes an array light source 311A and a collimator optical system 311B.

The array light source 311A of the light source device 311 is composed of a plurality of semiconductor lasers 3111 corresponding to a solid-state light source of the invention. Specifically, the array light source 311A is formed of the plurality of semiconductor lasers 3111 arranged in an array in a plane orthogonal to an illumination optical axis Ax1 of a luminous flux emitted from the array light source 311A. When the illumination optical axis of a luminous flux reflected by the fluorescent member 4 is defined as Ax2, the illumination optical axis Ax1 and the illumination optical axis Ax2 lie in the same plane and are orthogonal to each other although the details will be described later. The array light source 311A, the collimator optical system 311B, the afocal optical system 312, the homogenizer optical system 313, and the polarization separation device 314 are arranged in this order on the illumination optical axis Ax1.

On the other hand, the fluorescent member 4 including a wavelength conversion element 41, the pickup optical system 316, the retardation film 315, the polarization separation device 314, the integrator optical system 317, the polarization conversion element 318, and the superimposing lens 319 are arranged in this order on the illumination optical axis Ax2.

The semiconductor laser 3111 constituting the array light source 311A emits, for example, excitation light (blue light LB) having a peak wavelength in a wavelength region from 440 to 480 nm. Moreover, the blue light LB emitted from the semiconductor laser 3111 is coherent linearly polarized light and emitted in parallel with the illumination optical axis Ax1 toward the polarization separation device 314.

Moreover, in the array light source 311A, the polarization direction of the blue light LB emitted by each of the semiconductor lasers 3111 is coincident with the polarization direction of a polarization component (s-polarization component) that is reflected by a polarization separation layer 3143 of the polarization separation device 314. Then, the blue light LB emitted from the array light source 311A is incident on the collimator optical system 311B.

The collimator optical system 311B converts the blue light LB emitted from the array light source 311A to parallel light. The collimator optical system 311B includes, for example, a plurality of collimator lenses 3112 disposed in an array corresponding to the semiconductor lasers 3111. The blue light LB passing through the collimator optical system 311B and thus converted to parallel light is incident on the afocal optical system 312.

The afocal optical system 312 adjusts the luminous flux diameter of the blue light LB incident from the collimator optical system 311B. The afocal optical system 312 includes a lens 3121 and a lens 3122. The blue light LB passing through the afocal optical system 312 and thus adjusted in size is incident on the homogenizer optical system 313.

The homogenizer optical system 313 homogenizes, in cooperation with the pickup optical system 316 to be described later, an illuminance distribution by the blue light LB in an area to be illuminated. The homogenizer optical system 313 includes a pair of multi-lens arrays 3131 and 3132. The blue light LB emitted from the homogenizer optical system 313 is incident on the polarization separation device 314.

The polarization separation device 314 is a so-called prism-type polarizing beam splitter, and transmits one polarized light of p-polarized light and s-polarized light while reflecting the other polarized light. The polarization separation device 314 includes prisms 3141 and 3142 and the polarization separation layer 3143. The prisms 3141 and 3142 are formed in a substantially triangular prism shape, each have an inclined surface that forms an angle of 45° with the illumination optical axis Ax1, and form an angle of 45° with the illumination optical axis Ax2.

The polarization separation layer 3143 is provided on the inclined surfaces, and has a polarization separation function of separating the blue light LB in a first wavelength band incident on the polarization separation layer 3143 into an s-polarization component and a p-polarization component. The polarization separation layer 3143 reflects the s-polarization component of the blue light LB and transmits the p-polarization component of the blue light LB. Moreover, the polarization separation layer 3143 has a color separation function of transmitting light in a second wavelength band (the green light LG and the red light LR) different from the first wavelength band (the wavelength band of the blue light LB), among light incident on the polarization separation layer 3143, irrespective of the polarization state. The polarization separation device 314 is not limited to a prism-type one, and a plate-type polarization separation device may be used.

Then, the blue light LB incident on the polarization separation layer 3143 is reflected as s-polarized excitation light BLs, because the polarization direction is coincident with that of the s-polarization component, toward the fluorescent member 4, which corresponds to a phosphor of the invention. The configuration of the fluorescent member 4 will be described later.

The retardation film 315 is a quarter-wave plate that is disposed in the optical path between the polarization separation layer 3143 and the wavelength conversion element 41. The excitation light BLs, which is s-polarized light incident on the retardation film 315, is converted to circularly polarized excitation light BLc and thereafter incident on the pickup optical system 316.

The pickup optical system 316 condenses the excitation light BLc onto the wavelength conversion element 41. The pickup optical system 316 includes a lens 3161 and a lens 3162. Specifically, the pickup optical system 316 condenses a plurality of luminous fluxes (the excitation light BLc) incident thereon onto the wavelength conversion element 41 to be described later, and superimposes the luminous fluxes on each other on the wavelength conversion element 41.

The excitation light BLc from the pickup optical system 316 is incident on the wavelength conversion element 41 of the fluorescent member 4. The wavelength conversion element 41 converts a portion of the excitation light BLc to fluorescence YL containing red light and green light. The fluorescence YL has a peak wavelength in a wavelength region from 500 to 700 nm.

Then, the fluorescence YL emitted from the wavelength conversion element 41 passes through the pickup optical system 316 and the retardation film 315, and is incident on the polarization separation device 314. The fluorescence YL and the blue light (p-polarized blue light) passing through the polarization separation layer 3143 are combined by the polarization separation device 314, so that the illumination light WL of white is generated. The illumination light WL is emitted from the polarization separation device 314 and incident on the integrator optical system 317.

The integrator optical system 317 homogenizes, in cooperation with the superimposing lens 319 to be described later, an illuminance distribution in the area to be illuminated. The integrator optical system 317 includes a pair of lens arrays 3171 and 3172. The pair of lens arrays 3171 and 3172 include a plurality of lenses arranged in an array. The illumination light WL emitted from the integrator optical system 317 is incident on the polarization conversion element 318.

The polarization conversion element 318 is composed of a polarization separation film and a retardation film, and converts the illumination light WL to linearly polarized light. The illumination light WL emitted from the polarization conversion element 318 is incident on the superimposing lens 319.

The superimposing lens 319 superimposes the illumination light WL in the area to be illuminated, to thereby homogenize the illuminance distribution in the area to be illuminated. The illumination light WL whose illuminance distribution is homogenized by the superimposing lens 319 in this manner is emitted from the illumination device 31 toward the dichroic mirror 321.

[Configuration of Fluorescent Member]

Figure 3:
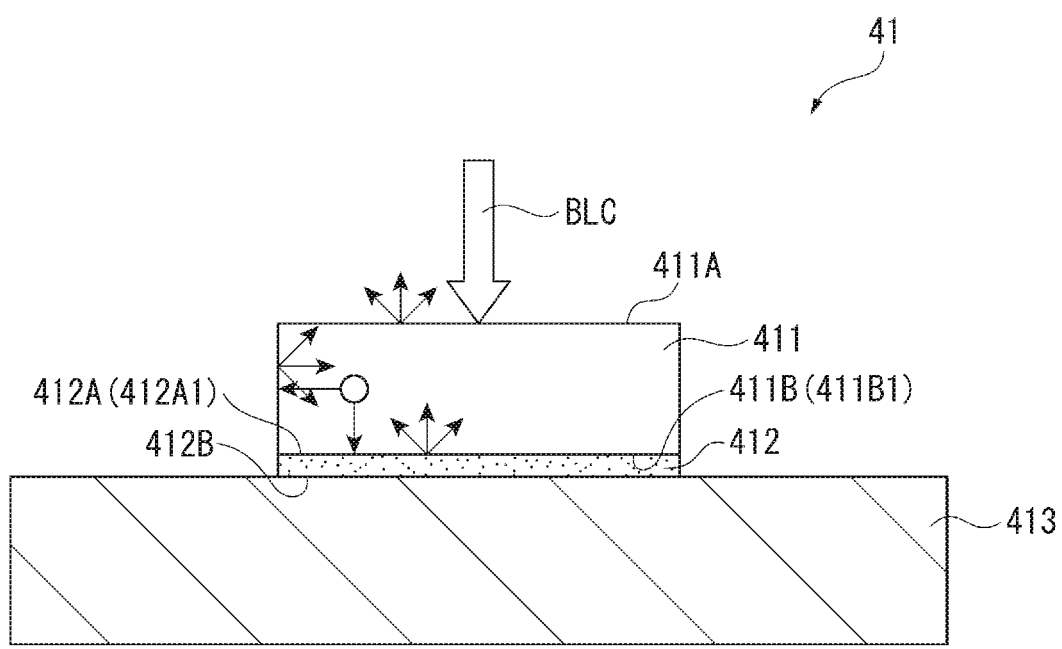
FIG. 3 A cross-sectional view showing the configuration of a fluorescent member of the illumination device according to the embodiment.

FIG. 3 is a cross-sectional view of the wavelength conversion element 41 in the fluorescent member 4.

As shown in FIG. 2, the fluorescent member 4 includes the wavelength conversion element 41, a disk-shaped fixing member 42, and a motor 43. Among these, the wavelength conversion element 41 includes a phosphor layer 411, a reflective layer 412, and a support substrate 413 as shown in FIG. 3. The phosphor layer 411 converts a portion of incident light to the fluorescence YL and emits the fluorescence YL, while emitting another portion of the incident light without converting it to the fluorescence YL. Moreover, the reflective layer 412 reflects light incident from the phosphor layer 411 toward the pickup optical system 316.

The phosphor layer 411 and the reflective layer 412 of the wavelength conversion element 41 are fixed to the support substrate 413 by the fixing member 42 provided between the side surfaces of the phosphor layer 411 and the reflective layer 412 and the support substrate 413. Moreover, the motor 43 is disposed on a surface of the support substrate 413 on the side opposite to a surface thereof that supports the phosphor layer 411. The fixing member 42 is rotated by the motor 43, so that the wavelength conversion element 41, which generates heat with the generation of the fluorescence YL, is cooled.

[Configuration of Phosphor Layer]

The phosphor layer 411 includes a first surface 411A through which the fluorescence YL is emitted, and a surface that opposes the first surface 411A, that is, a second surface 411B facing the reflective layer 412. Among these, the second surface 411B includes a bottom surface area 411B1 opposing the first surface 411A.

Moreover, a phosphor that constitutes the phosphor layer 411 is an yttrium-aluminum-garnet (YAG) phosphor containing Ce ions. The phosphor layer 411 is an inorganic phosphor layer and includes, for example, a resin binder as a binder.

[Configuration of Reflective Layer]

The reflective layer 412 is composed of a sintered body containing a metallic oxide, and reflects light incident from the phosphor layer 411. The reflective layer 412 is an aluminum oxide ($Al_2O_3$) sintered body and is a non-metallic inorganic reflective member. The reflective layer 412 includes a top surface section 412A and a bottom surface section 412B. Among these, the top surface section 412A includes a first area 412A1 directly coupled to the bottom surface area 411B1 of the phosphor layer 411. Moreover, the bottom surface section 412B is directly coupled to the support substrate 413. In this manner, the reflective layer 412 is fixed on the support substrate 413, and the phosphor layer 411 is fixed on the reflective layer 412.

[Wavelength Component of Illumination Light Emitted from Illumination Device]

Figure 4:
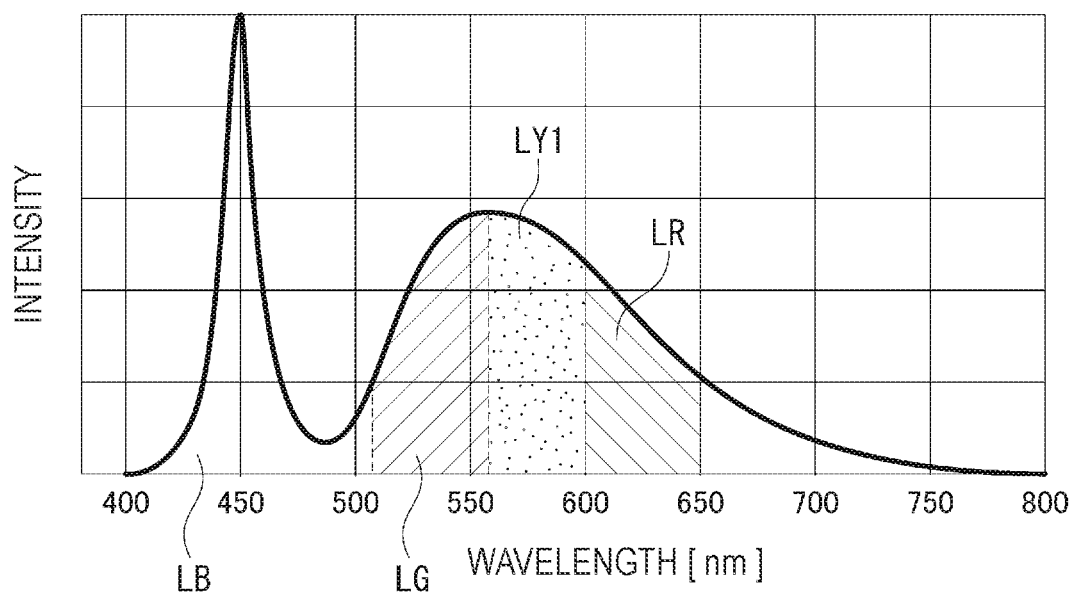
FIG. 4 A diagram showing an example of a wavelength region of emission light emitted from the illumination device according to the embodiment.

FIG. 4 is a diagram showing an example of a spectral intensity distribution of the illumination light WL emitted from the illumination device 31.

The illumination light WL emitted from the illumination device 31 including the array light source 311A emitting the blue light LB and the YAG phosphor has a spectral intensity distribution as shown in FIG. 4. Specifically, in the spectral intensity distribution, the blue light LB is light in a wavelength region from 440 to 480 nm (blue wavelength region). Moreover, the green light LG is light in a wavelength region from 510 to 560 nm (green wavelength region). Further, the red light LR is light in a wavelength region from 600 to 650 nm (red wavelength region), and in addition, yellow light LY1 between the green light LG and the red light LR is light in a wavelength region from 560 to 600 nm (yellow wavelength region).

Here, since the blue light LB emitted from the array light source 311A is light around a wavelength region 450 nm, the blue light LB has a very high light intensity at a wavelength around 450 nm in the spectral intensity distribution of the illumination light WL. For this reason, the intensity of light in a wavelength region between the blue wavelength region and the green wavelength region is low compared to the blue light LB and the green light LG, and therefore, there is no need to attenuate the light.

In contrast, in the illumination device 31 using the array light source 311A and the YAG phosphor, the green light LG, the yellow light LY1, and the red light LR have substantially the same light intensity in the spectral intensity distribution of the illumination light WL. For this reason, it is necessary to attenuate the light in the wavelength region between the green wavelength region and the red wavelength region, that is, in the yellow wavelength region. At least a portion of the light in the yellow wavelength region is attenuated by the first filter 51 and the second filter 52 to be described later.

The yellow wavelength region corresponds to an dimming wavelength region of the invention.

[Configurations of Filters]

As shown in FIG. 1, the first filter 51 as a low-pass filter and the second filter 52 as a high-pass filter are color filters (cinema filters) that are insertably and removably disposed respectively on the optical paths of the green light LG and the red light LR. The first filter 51 and the second filter 52 have the functions of respectively transmitting (attenuating) lights in different predetermined wavelength regions from the green light LG and the red light LR. Specifically, the first filter 51 transmits light at a wavelength shorter than a first threshold wavelength, and attenuates light at a wavelength longer than the first threshold wavelength. Moreover, the second filter 52 transmits light at a wavelength longer than a second threshold wavelength, and attenuates light at a wavelength shorter than the second threshold wavelength.

[Light Transmittances of Filters]

Figure 5:
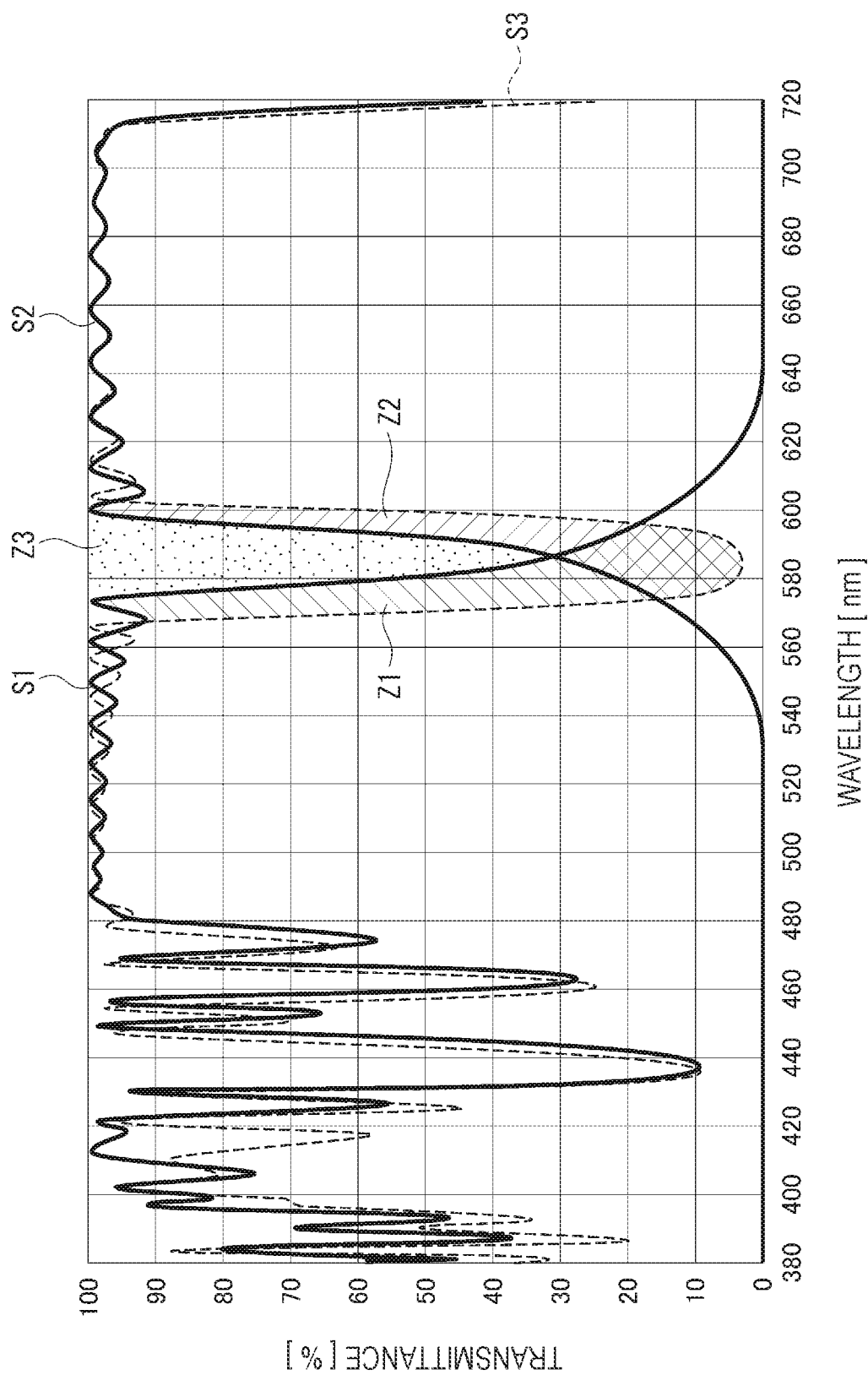
FIG. 5 A diagram showing the light transmittances obtained when a first filter and a second filter are used for one of lights separated by a dichroic mirror according to the embodiment.

FIG. 5 is a diagram showing the light transmittances obtained when the first filter 51 and the second filter 52 are used. In FIG. 5, the light transmittance obtained when a band-stop filter is used is also shown by a broken line S3.

A solid line S1 in FIG. 5 shows the light transmittance obtained when the first filter 51 is used. As shown by the solid line S1 in FIG. 5, the first filter 51 has the functions of transmitting light at a wavelength at which 90% of light transmits therethrough in the yellow wavelength region, that is, light (light in the green wavelength region and a portion of light in the yellow wavelength region) in a wavelength region equal to or less than 578 nm, which is the first threshold, and cutting out light in a wavelength region exceeding the 578 nm. Specifically, according to the first filter 51, the light transmission of the light in the wavelength region exceeding 578 nm is lowered as the wavelength region increases. For example, the light transmittance of light in a wavelength region of 580 nm is approximately 50%; the light transmittance of light in a wavelength region of 600 nm is approximately 15%; and light in a wavelength region exceeding 640 nm is substantially completely cut out.

On the other hand, a solid line S2 in FIG. 5 shows the light transmittance obtained when the second filter 52 is used. As shown by the solid line S2 in FIG. 5, the second filter 52 has the functions of transmitting light at a wavelength at which 90% of light transmits therethrough in the yellow wavelength region, that is, light (light in the red wavelength region and a portion of light in the yellow wavelength region) in a wavelength region equal to or greater than 595 nm, which is the second threshold, and cutting out light in a wavelength region below the 595 nm. Specifically, according to the second filter 52, the light transmission of the light in the wavelength region below 595 nm is lowered as the wavelength region decreases. For example, the light transmittance of light in a wavelength region of 590 nm is approximately 40%; the light transmittance of light in a wavelength region of 580 nm is approximately 20%; and light in a wavelength region below 540 nm is substantially completely cut out.

That is, in the embodiment, the first threshold 578 nm and the second threshold 595 nm are set in the bandwidth from 560 to 600 nm of the yellow wavelength region, and a difference 17 nm between the first threshold and the second threshold is smaller than the bandwidth 40 nm.

Here, when the above filter is used for the light LY separated by the dichroic mirror 321, most of the light in the wavelength region from 565 to 610 nm is attenuated as shown by the broken line S3 in FIG. 5. For this reason, since light in wavelength regions that can be originally used as the red light LR and the green light LG is also attenuated, there is a problem in that the luminance and chroma of an image projected from the projection optical device 36 are reduced.

In contrast, in the embodiment, when the first filter 51 is disposed on the optical path of the green light LG, light in the range of a wavelength region Z1 in FIG. 5, among light in a wavelength region Z3 cut out by the above filter, that is, light on the green wavelength region side in the wavelength region Z3 can be used as the green light LG.

On the other hand, when the second filter 52 is disposed on the optical path of the red light LR, light in the range of a wavelength region Z2 in FIG. 5, among the light in the wavelength region Z3 cut out by the above filter, that is, light on the red wavelength region side in the wavelength region Z3 can be used as the red light LR. That is, by using the first filter 51 and the second filter 52 instead of the above filter, approximately half region of the wavelength region Z3 can be used as the green light LG and the red light LR.

[Positions of Filters on Optical Paths]

As shown in FIG. 1, the first filter 51 described above is configured in a rectangular plate shape, and disposed insertably and removably between the dichroic mirror 322 and the parallelizing lens 33G on the optical path of the green light LG. Moreover, the second filter 52 is configured in a rectangular plate shape similarly to the first filter 51, and disposed between the total reflection mirror 324 and the relay lens 327 on the optical path of the red light LR. Further, the second filter 52 is disposed on the projection optical device 36 side of the first filter 51. For this reason, the second filter 52 is insertably and removably disposed in front of and near the relay lens 327 on the optical path of the red light.

The first filter 51 and the second filter 52 are disposed in the positions described above, and thus the color gamuts of the green light LG and the red light LR are properly expanded.

[Positions of Filters During Storage]

The first filter 51 and the second filter 52 are stored in a storage section SP in the external housing 2. The storage section SP is provided between the optical path of the green light LG reflected by the dichroic mirror 322 and the optical path of the red light LR reflected by the total reflection mirror 324 through the dichroic mirror 322. The storage section SP includes a first storage section SP1 and a second storage section SP2. The second storage section SP2 is disposed on the projection optical device 36 side of the first storage section SP1. The first filter 51 is stored in the first storage section SP1, and the second filter 52 is stored in the second storage section SP2. For this reason, the first filter 51 and the second filter 52 are stored in the state of overlapping each other when stored in the storage section SP.

[Driving of Filters]

A drive section (not shown) is attached to each of the first filter 51 and the second filter 52, and the first filter 51 and the second filter 52 move by driving of the drive sections along the directions of arrows shown in FIG. 1. Due to this, the first filter 51 and the second filter 52 are freely insertably and removably disposed on the optical paths of the red light LR and the green light LG. The driving of the first filter 51 and the driving of the second filter 52 are substantially simultaneously carried out in response to, for example, a user's operation or the like. In other words, the first filter 51 and the second filter 52 are switched between the state where both the first filter 51 and the second filter 52 are inserted on the optical paths and the state where both the first filter 51 and the second filter 52 are retracted from the optical paths. A drive control process of the drive sections to drive the first filter 51 and the second filter 52 will be described later.

[Filter Drive Process by Control Device]

The projector 1 has, for example, a cinema mode that ensures a color gamut and a normal mode that ensures brightness, which are set by a user's operation or the like.

When an operating section (not shown) provided in the projector 1 is operated, in the state where the normal mode is selected, by the user to select the cinema mode, the control device CU moves (disposes) the first filter 51 and the second filter 52 from the storage section SP onto the optical paths. Due to this, the color gamut of a projection image can be expanded.

On the other hand, when the normal mode is selected, in the state where the cinema mode is selected, through the operation of the operating section by the user, the first filter 51 and the second filter 52 are stored in the storage section SP from the optical paths. Due to this, the brightness of the projection image can be ensured.

The projector 1 according to the embodiment described above has the following effects.

When the green light LG separated by the dichroic mirror 322 is incident on the first filter 51, the first filter 51 attenuates the light at the wavelength exceeding the first threshold 578 nm in the yellow wavelength region; while when the red light LR is incident on the second filter 52, the second filter 52 attenuates the light at the wavelength not reaching the second threshold 595 nm in the yellow wavelength region. Therefore, the light in the wavelength regions that cannot be used as the green light LG and the red light LR can be attenuated. In other words, the first filter 51 transmits light at a wavelength not reaching the first threshold in the yellow wavelength region, and the second filter 52 transmits light at a wavelength exceeding the second threshold in the yellow wavelength region. Therefore, the light at the wavelength not reaching the first threshold, among the light in the yellow wavelength region, can be used as the green light LG, and the light at the wavelength exceeding the second threshold, among the light in the yellow wavelength region, can be used as the red light LR. That is, it is possible to sufficiently attenuate the light in the yellow wavelength region by the first filter 51 and the second filter 52, and it is also possible to suppress undue attenuation of light in the wavelength regions of the green light LG and the red light LR. Accordingly, it is possible to expand a color gamut while suppressing a reduction in the luminance of a projection image.

The difference 17 nm between the first threshold 578 nm and the second threshold 595 nm is smaller than the bandwidth from 560 nm to 600 nm (40 nm) of the yellow wavelength region, and therefore, the wavelength region of light transmitted through the first filter 51 and the second filter 52 can be expanded in the yellow wavelength region. According to this, the amount of light attenuated by the first filter 51 and the second filter 52 can be reliably reduced, and therefore, it is possible to reliably suppress a reduction in the luminance of the image to be projected.

The first filter 51 and the second filter 52 are switched between the state where both the first filter 51 and the second filter 52 are inserted on the optical paths and the state where both the first filter 51 and the second filter 52 are retracted from the optical paths. Therefore, it is possible with a simple configuration to expand the color gamut while suppressing a reduction in the luminance of the projection image, compared to a configuration in which the first filter 51 and the second filter 52 are separately inserted and removed.

Here, when the first filter 51 and the second filter 52 are individually stored in different positions, spaces for storing the first filter 51 and the second filter 52 are respectively needed, and thus there is a risk that the projector 1 increases in size.

In contrast, in the embodiment, the first filter 51 and the second filter 52 are stored in one storage section SP in an overlapping manner between the optical path of the red light LR and the optical path of the green light LG. Therefore, the storage space can be reduced compared to the case where the first filter 51 and the second filter 52 are stored in the different positions. Accordingly, the projector 1 can be reduced in size.

Here, the relay lens 327 is disposed on the optical path of the red light LR having a long distance to the light modulation device 34R. For this reason, in an area adjacent to the optical path on which the relay lens 327 is provided, the storage space for the first filter 51 and the second filter 52 is present.

According to the embodiment, the first filter 51 is insertably and removably provided on the light incident side of the relay lens 327, and therefore, the first filter 51 and the second filter 52 can be stored in the storage space (the storage section SP). Accordingly, there is no need to separately provide storage spaces, and therefore, it is possible to suppress an increase in the size of the projector 1.

Here, the illumination light WL emitted from the illumination device 31 including the YAG phosphor as a phosphor and the array light source 311A as a solid-state light source contains fluorescence, and therefore, the intensity of light in the yellow light wavelength region in the wavelength region of light emitted from the illumination device 31 is substantially equal to the intensities of lights in the respective wavelength regions of the red light wavelength region and the green light wavelength region.

Moreover, the first filter transmits, together with light in the green wavelength region, a portion of light in the yellow wavelength region as light in the green wavelength region, and the second filter transmits, together with light in the red wavelength region, a portion of light in the yellow wavelength region as light in the red wavelength region. According to this, the amount of light in the yellow wavelength region attenuated by the first filter and the second filter can be reduced in the red light and the green light that are separated by the second color separation device. Accordingly, it is possible to expand the color gamut while reliably suppressing a reduction in the luminance of the projection image.

Modifications of Embodiment

The invention is not limited to the embodiment, and modifications, improvements, and the like within the range capable of achieving the object of the invention are included in the invention.

In the embodiment, the first filter 51 and the second filter 52 are inserted or removed at substantially the same time. However, the invention is not limited to this. For example, in the projector 1, a configuration may be employed in which an operating button or the like that enables switching between various modes is provided and only any of the first filter 51 and the second filter 52 is insertable and removable by the mode switching button.

In the embodiment, the illumination device 31 includes the array light source 311A as a solid-state light source, and includes the YAG phosphor as a phosphor. However, the invention is not limited to this. For example, the illumination device 31 may include an RG phosphor instead of the YAG phosphor. Moreover, instead of the array light source 311A, a UV light source that emits UV light may be included as a solid-state light source. In this case, an RGB phosphor may be included as a phosphor.

In the embodiment, the first filter 51 and the second filter 52 are stored in an overlapping manner in the storage section SP when removed from the optical paths of the red light LR and the green light LG. However, the invention is not limited to this. For example, the first filter 51 and the second filter 52 may be stored in different positions.

In the embodiment, the second filter 52 is insertably and removably provided in front of and near the relay lens 327 on the optical path of the red light LR. However, the invention is not limited to this. For example, the second filter 52 may be insertably and removably provided at the back of and near the relay lens 327. Moreover, the relay lens 327 may not be provided.

In the embodiment, the dichroic mirror 321 separates the illumination light WL into the blue light LB and the light LY, and the dichroic mirror 322 separates the light LY into the red light LR and the green light LG. However, the invention is not limited to this. For example, the dichroic mirror 322 may separate the illumination light WL into the blue light LB and the light LY, and the dichroic mirror 321 may separate the light LY into the red light LR and the green light LG. In this case, the illumination device 31 may emit the illumination light WL to the dichroic mirror 322.

In the embodiment, the light in the range of the wavelength region Z1, that is, approximately half the wavelength region Z3 is used as the green light LG through the first filter 51, and the light in the range of the wavelength region Z2, that is, approximately half the wavelength region Z3 is used as the red light LR through the second filter 52. However, the invention is not limited to this. Wavelength cut-out regions of the first filter 51 and the second filter 52 can be appropriately changed. In short, it is sufficient that a portion of light that is cut out by the above filter is included in a portion of wavelength regions that are not cut out by the first filter 51 and the second filter 52. According to this, effects similar to those of the embodiment can be provided.

In the embodiment, the drive section (not shown) is provided in the first filter 51 and the second filter 52.

However, the invention is not limited to this. For example, an operating section that can be operated by the user may be provided in the first filter 51 and the second filter 52. According to this, the first filter 51 and the second filter 52 can be freely inserted on and removed from the respective optical paths of the red light LR and the green light LG based on user's intention.

In the embodiment, the arrangement of the optical components in the optical unit 3 is configured as shown in FIG. 1. However, the invention is not limited to this. The arrangement of the optical unit 3 can be appropriately changed, and, for example, a configuration having substantially an L-shape in a plan view or a configuration having substantially a U-shape in a plan view may be employed.

In the embodiment, the projector 1 includes the three light modulation devices 34 (34R, 34G, 34B), but the invention is not limited to this. That is, the invention can be applied also to a projector using two or less, or four or more, light modulation devices.

Moreover, a light modulation device other than that of liquid crystal, such as a digital micromirror device, may be used as a light modulation device.

In the embodiment, the illumination device 31 includes the solid-state light source (the array light source 311A) and the fluorescent member 4. However, the invention is not limited to this. For example, the illumination device 31 may include a light source lamp or the like including a light source and a reflector. Moreover, in this case, the number of the light source lamps is not limited to one, but more than one light source lamp may be used.

The entire disclosure of Japanese Patent Application No. 2015-204662, filed on Oct. 16, 2015 is expressly incorporated by reference herein.

The invention claimed is:

1. A projector comprising:
an illumination device;
a first color separation device that separates first color light and second color light from light emitted from the illumination device;
a second color separation device that separates third color light and fourth color light from the second color light separated by the first color separation device;
a plurality of light modulation devices that modulate the lights separated by the first color separation device and the second color separation device;
a projection optical device that projects an image based on the lights modulated by the plurality of light modulation devices;
a first filter that is insertably and removably provided on an optical path of the third color light; and
a second filter that is insertably and removably provided on an optical path of the fourth color light, wherein
the optical path of the third color light is parallel to the optical path of the fourth color light at a position where a first filter and a second filter are disposed,
a wavelength of the third color light is shorter than a wavelength of the fourth color light,
the first filter attenuates light at a wavelength exceeding a first threshold set in an dimming wavelength region that is a wavelength region between a wavelength region of the third color light and a wavelength region of the fourth color light,
the second filter attenuates light at a wavelength equal to or less than a second threshold set in the dimming wavelength region,
the first filter and the second filter are stored in an overlapping manner between the optical path of the third color light and the optical path of the fourth color light, and
the first filter and the second filter are each plate-shaped and, when being stored, are parallel with each other.

2. The projector according to claim 1, wherein
a difference between the first threshold and the second threshold is smaller than a bandwidth of the dimming wavelength region.

3. The projector according to claim 2, wherein
the first filter and the second filter are switched between the state where both of them are inserted on the optical paths and the state where both of them are retracted from the optical paths.

4. The projector according to claim 2, further comprising a relay lens on the optical path of at least one of the third color light and the fourth color light, wherein
the first filter or the second filter, for which the relay lens is disposed, is insertably and removably provided on a light incident side of the relay lens on the optical path on which the relay lens is disposed.

5. The projector according to claim 1, wherein
the first filter and the second filter are switched between the state where both of them are inserted on the optical paths and the state where both of them are retracted from the optical paths.

6. The projector according to claim 1, further comprising a relay lens on the optical path of at least one of the third color light and the fourth color light, wherein
the first filter or the second filter, for which the relay lens is disposed, is insertably and removably provided on a light incident side of the relay lens on the optical path on which the relay lens is disposed.

7. The projector according to claim 1, wherein
the illumination device includes
a solid-state light source, and
a phosphor on which light emitted from the solid-state light source is incident,
the first color light is blue light,
the second color light is color light containing green light and red light,
the third color light is green light,
the fourth color light is red light,
the wavelength region of the first filter is contained in a green wavelength region,
the wavelength region of the second filter is contained in a red wavelength region, and
the dimming wavelength region is set to a yellow wavelength region.

8. The projector according to claim 1, wherein
when being inserted or retracted, the first filter and the second filter move in a direction perpendicular to a direction in which they overlap.

9. The projector according to claim 1, further comprising a storing space that stores both the first filter which is removably inserted in the optical path of the third color light and the second filter which is removably inserted in the optical path of the fourth color light.

10. A projector comprising:
an illumination device;
a first color separation device that separates first color light and second color light from light emitted from the illumination device;
a second color separation device that separates third color light and fourth color light from the second color light separated by the first color separation device;

a plurality of light modulation devices that modulate the lights separated by the first color separation device and the second color separation device;

a projection optical device that projects an image based on the lights modulated by the plurality of light modulation devices;

a first filter that is insertably and removably provided on an optical path of the third color light and a second filter that is insertably and removably provided on an optical path of the fourth color light, wherein when being inserted or retracted, the first filter and the second filter move in a direction perpendicular to a direction in which they overlap, and the first filter and the second filter move in opposite directions to be inserted on the optical path of the third color light and the optical path of the fourth color light, respectively, a wavelength of the third color light is shorter than a wavelength of the fourth color light, the first filter attenuates light at a wavelength exceeding a first threshold set in a a dimming wavelength region that is a wavelength region between a wavelength region of the third color light and a wavelength region of the fourth color light, the second filter attenuates light at a wavelength equal to or less than a second threshold set in the dimming wavelength region, the first filter and the second filter are stored in an overlapping manner between the optical path of the third color light and the optical path of the fourth color light, and the first filter and the second filter are each plate-shaped and, when being stored, are parallel with each other.

* * * * *